US006430561B1

(12) United States Patent
Austel et al.

(10) Patent No.: US 6,430,561 B1
(45) Date of Patent: Aug. 6, 2002

(54) SECURITY POLICY FOR PROTECTION OF FILES ON A STORAGE DEVICE

(75) Inventors: Vernon Ralph Austel, Cortlandt Manor; Paul Ashley Karger, Chappaqua; David Claude Toll, Wappingers Falls, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/429,963

(22) Filed: Oct. 29, 1999

(51) Int. Cl.⁷ .............................................. G06F 17/30
(52) U.S. Cl. ............................ 707/9; 707/9; 713/200; 713/201
(58) Field of Search ............................ 707/1–2, 5–10, 707/100–102, 200–206, 500, 526; 713/153–172, 182, 187, 189–201, 166

(56) References Cited

U.S. PATENT DOCUMENTS

| | | | | |
|---|---|---|---|---|
| 5,596,718 A | * | 1/1997 | Bebert et al. ................ | 713/201 |
| 6,047,377 A | * | 4/2000 | Gong .......................... | 713/201 |
| 6,157,721 A | | 12/2000 | Shear et al. | |
| 6,237,786 B1 | * | 5/2001 | Ginter et al. ................ | 213/153 |
| 6,292,569 B1 | | 9/2001 | Shear et al. | |

OTHER PUBLICATIONS

Lawrence J. Shirley et al., "Mechanism Sufficiency Validation by Assignment", Proceedings of the 1981 Symposium on Security and Privacy, pp. 26–32, APr. 27–29, 1981.

Steven B. Lipner, "Non–Discretionary Controls for Commercial Applications", Digital Equipment Corporation, Hudson, MA, IEEE, pp. 2–10, 1982.

D. E. Bell et al., "Secure Computer System: Unified Exposition and Multics Interpretation", Prepared for Deputy for Command and Management Systems, Electronic Systems Division, Air Force Systems Command, United States Air Force, 129 pages, Mar. 1976.

* cited by examiner

Primary Examiner—Alford W. Kindred
(74) Attorney, Agent, or Firm—Ratner & Prestia

(57) ABSTRACT

Access to files by accessing programs, where files comprise other files, programs and data is controlled. An initial access class is assigned to each file and to each accessing program. An access class comprises an integrity access class and a secrecy access class. An integrity access class comprises rules governing modification of data contained in files and a security access class comprises rules governing disclosure of data contained in files. An integrity access class comprises a set of rules for allowing the performance of a read function, and another set of rules for allowing the performance of write/execute function. An execute function comprises transferring and chaining, where chaining comprises starting another process running at potentially different secrecy and integrity access classes. A secrecy access class comprises a set of rules for allowing the performance of a write function, and another set of rules for allowing the performance of read/execute function. The respective access classes of the target file, target program, and accessing program are compared. If the comparison results meet the security requirements, the function is performed.

18 Claims, 9 Drawing Sheets

SECURITY POLICY FOR PROTECTION OF FILES ON A STORAGE DEVICE

FIELD OF THE INVENTION

The subject invention relates to a security policy for controlling access to data, and specifically to the control of access to files on a storage device such as smart cards.

BACKGROUND OF THE INVENTION

A formal model of security is essential when reasoning about the security of a system. Security models can be broken down into three major categories: (1) models that protect against unauthorized disclosure of information, (2) models that protect against unauthorized tampering or sabotage, and (3) models that protect against denial of service. Protection against disclosure of information has been understood the longest and has the simplest models. Protection against tampering or sabotage has been less well understood and appropriate models are only now under development. Protection against denial of service is not well understood today.

A first requirement of many security systems is preventing unauthorized disclosure of information. Classes of mechanisms include discretionary access controls and mandatory access controls. Discretionary access controls are the commonly available security controls based on the fully general Lampson access matrix . (Lampson, B. W., Protection. Operating Systems Review, January 1974. 8(1): p. 18–24. originally published in Proceedings of the Fifth Princeton Conference on Information Sciences and Systems, March 1971.) They are called discretionary, because the access rights to an object may be determined at the discretion of the owner or controller of the object. Both access control list and capability systems are examples of discretionary access controls. The presence of Trojan horses in the system can cause great difficulties with discretionary controls. The Trojan horse could surreptitiously change the access rights on an object or could make a copy of protected information and give threat copy to some unauthorized user. All forms of discretionary controls are vulnerable to this type of Trojan horse attack. A Trojan horse in a capability system could make a copy of a capability for a protected object and then store that capability in some other object to which a penetrator would have read access. In both cases, the information is disclosed to an unauthorized recipient.

Lampson (Lampson, B. W., A note on the confinement problem. Communications of the ACM, October 1973. 16(10): p. 613–615.) has defined the confinement problem as determining whether there exists a series of operations in a security system that will ultimately leak some information to some unauthorized individual. Harrison, Ruzzo, and Ullman (Harrison, M. A., W. L. Ruzzo, and J. D. Ullman, Protection in Operating Systems. Communications of the ACM, August 1976. 19(8): p. 461–471.) have shown that there is no solution to the confinement problem for fully general, discretionary access controls, such as either a general access control list or capability system. Their argument is based on modeling the state transitions of the access matrix as the state transitions of a Turing machine. They show that solving the confinement problem is equivalent to solving the Turing machine halting problem.

The paths over which a Trojan horse leaks information are called covert channels. Covert channels can be divided into two major categories: storage channels and timing channels. Information can be leaked through a storage channel by changing the values of any of the state variables of the system. Thus, contents of files, names of files, and amount of disk space used are all examples of potential storage channels. A Trojan horse can leak information through a storage channel in a purely asynchronous fashion. There are no timing dependencies.

By contrast, information can be leaked through a timing channel by modifying the length of time that system functions take to complete. For example, a Trojan horse could encode information into deliberate modifications of the system page fault rate. Timing channels all use synchronous communication and require some form of external clocking.

Mandatory access controls have been developed to deal with the Trojan horse problems of discretionary access controls. The distinguishing feature of mandatory access controls is that the system manager or security officer may constrain the owner of an object in determining who may have access rights to that object. All mandatory controls, to date, have been based on lattice security models.

Various models describing security properties of computing systems and users exist in the art. Because access is at the heart of the security requirements of computing systems, access control is the basis of many of these models. Of particular interest are lattice security models. A lattice security model consists of a set of access classes that form a partial ordering. Access classes that are not ordered are called disjoint. Any two access classes may be less than, greater than, equal to, or not ordered with respect to one another. Furthermore, there exists a lowest access class, called system low, such that system low is less than or equal to all other access classes. There also exists a highest access class, called system high, such that all other access classes are less than or equal to system high.

A very simple lattice might consist of two access classes: LOW and HIGH. LOW is less than HIGH. LOW is system low, and HIGH is system high. A slightly more complex example might be a list of secrecy levels, such as UNCLASSIFIED, CONFIDENTIAL, SECRET, and TOP SECRET. In this case, UNCLASSIFIED is system low, and TOP SECRET is system high. Each level in the list represents data of increasing secrecy.

There is no requirement for strict hierarchical relationships between access classes. The U.S. military services use a set of access classes that have two parts: a secrecy level and a set of categories. Categories represent compartments of information for which an individual must be specially cleared. To gain access to information in a category, an individual must be cleared, not only for the secrecy level of the information, but also for the specific category. For example, if there were a category NUCLEAR, and some information classified SECRET-NUCLEAR, then an individual with a TOP SECRET clearance would not be allowed to see that information, unless the individual were specifically authorized for the NUCLEAR category.

Information can belong to more than one category, and category comparison is done using subsets. Thus, in the military lattice model, for access class A to be less than or equal to access class B, the secrecy level of A must be less than or equal to the secrecy level of B, and the category set of A must be an improper subset of the category set of B. Since two category sets may be disjoint, the complete set of access classes has only a partial ordering. There is a lowest access class, {UNCLASSIFIED-no categories}, and a highest access class, {TOP SECRET-all categories}. The access classes made up of levels and category sets form a lattice.

Lattice models were first developed at the MITRE Corporation by Bell and LaPadula (Bell, D. E. and L. J.

LaPadula, Secure Computer Systems: A Mathematical Model, ESD-TR-73-278, Vol. II, November 1973, The MITRE Corporation, Bedford, Mass.: HQ Electronic Systems Division, Hanscom AFB, Mass.) and at Case Western Reserve University by Walter (Walter, K. G., W. F. Ogden, W. C. Rounds, F. T. Bradshaw, S. R. Ames, and D. G. Shumway, Primitive Models for Computer Security, ESD-TR-74-117, Jan. 23, 1974, Case Western Reserve University, Cleveland, Ohio: HQ Electronic Systems Division, Hanscom AFB, Mass.) to formalize the military security model and to develop techniques for dealing with Trojan horses that attempt to leak information. At the time, dealing with Trojan horses was difficult, yet it was found that two quite simple properties could prevent a Trojan horse from compromising sensitive information.

First, the simple security property says that if a subject wishes to gain read access to an object, the access class of the object must be less than or equal to the access of the subject. This is just a formalization of military security clearance procedures that one may not read a document unless one is properly cleared. Second, the confinement property requires that if a subject wishes to gain write access to an object, the access class of the subject must be less than or equal to the access class of the object. The net effect of enforcing the confinement property is that any Trojan horse that attempts to steal information from a particular access class cannot store that information anywhere except in objects that are classified at an access class at least as high as the source of the information. Thus, the Trojan horse could tamper with the information, but it could not disclose the information to any unauthorized individual.

Biba (Biba, K. J., Integrity Considerations for Secure Computer Systems, ESD-TR-76-732, April 1977, The MITRE Corporation, Bedford, Mass.: HQ Electronic Systems Division, Hanscom AFB, Mass.) later developed a model of mandatory integrity that is a mathematical dual of the Bell and LaPadula mandatory security model. Biba defines a set of integrity access classes that are analogous to security access classes and defines simple integrity and integrity confinement properties that are analogous to the simple security and confinement properties. The difference between integrity and security is that the direction of the less than signs are all reversed, so that a program of high integrity is prevented form reading or executing low integrity objects that could be the source of tampering or sabotage. The principal difficulty with the Biba integrity model is that it does not model any practical system. Unlike the security models that developed from existing military security systems, the Biba integrity model developed from a mathematical analysis of the security modes.

Lipner developed a commercial integrity model (Lipner, S. B. Non-Discretionary Controls for Commercial Applications. in Proceedings of the 1982 Symposium on Security and Privacy, Apr. 26–28, 1982. Oakland, Calif.: IEEE Computer Society, pp. 2–10) that uses both the mandatory security and mandatory integrity models to represent a software development environment in a bank. It tied the integrity modeling much closer to reality than the Biba model did, but it was still quite complex. The inventors are not aware of any effort to actually implement the Lipner commercial integrity mode.

A more recent development in preventing tampering and sabotage is the Clark and Wilson commercial integrity model (Clark, D. D. and D. R. Wilson. A Comparison of Commercial and Military Computer Security Policies. in 1987 IEEE Symposium on Security and Privacy. Apr. 27–29, 1987. Oakland, Calif.: IEEE Computer Society, pp. 184–194.). They have proposed a model of data integrity that they assert more accurately describes the needs of a commercial application than the Bell and LaPadula lattice security model (Bell, D. E. and L. J. LaPadula, Computer Security Model: Unified Exposition and Multics Interpretation, ESD-TR-75-306, Jun. 1975, The MITRE Corporation, Bedford, Mass.: HQ Electronic Systems Division, Hanscom AFB, Mass.). Clark and Wilson's model focuses on two notions: well formed transactions and separation of duties. Separation of duties is commonly used in commercial organizations to protect against fraud. Clark and Wilson contrasted their work with Lipner's commercial security interpretation of the lattice security and integrity models and concluded that Lipner's commercial model does not adequately deal with limiting data manipulation to specific programs to implement the well formed transactions.

Secure Karger (Karger, P. A. Implementing Commercial Data Integrity with Secure Capabilities, in Proceedings of the 1988 IEEE Symposium on Security and Privacy. Apr. 18–21, 1988. Oakland, Calif. IEEE Computer Society, pp. 130–139) proposed an implementation of Clark and Wilson's commercial security model and showed how a restricted capability model combined with the lattice security model can aid in that implementation. The paper also discusses why Clark and Wilson's security model may present much more difficult problems than the relatively simple lattice security models. In the implementation, audit trails take a much more active role in security enforcement than in previous systems. In particular, access control decisions are based on historical information retrieved from the audit trail, as well as on descriptive rules of who may have access to what. The need for historical audit trails, however, may make such a model impossible to implement on a smart card, due to the extreme lack of memory available to hold the audit data.

A difficult problem in the field of security enforcement is preventing denial of service attacks. This is because there is no good definition of what denial of service actually means. Furthermore, it can be argued informally that detecting and preventing a malicious denial of service attack may be equivalent to solving the Turing machine halting problem. Various systems have been devised for allocating quotas and limiting resource expenditures in computer systems, but none of these have dealt with malicious denial of service attacks that might be implemented in the form of Trojan horses or trap doors. While the integrity models could provide some assistance, denial of service remains a major unsolved problem in computer security.

SUMMARY OF THE INVENTION

A method and apparatus control access to files by accessing programs, where files comprise other files, programs and data. The method comprises the steps of assigning an initial access class to each file and to each accessing program. An access class comprises an integrity access class and a secrecy access class. An integrity access class comprises rules governing modification of data contained in files and a security access class comprises rules governing disclosure of data contained in files. An integrity access class comprises a set of rules for allowing the performance of a read function, and another set of rules for allowing the performance of write/execute function. An execute function comprises transferring and chaining, where chaining comprises starting another process running at potentially different secrecy and integrity access classes. A secrecy access class comprises a set of rules for allowing the performance of a write function, and another set of rules for allowing the performance of read/execute function. The respective access classes of the target file, target program, and accessing program are compared. If the comparison results meet the security requirements of the particular function, then the function is performed.

BRIEF DESCRIPTION OF THE DRAWINGS

The invention is best understood from the following detailed description when read in connection with the accompanying drawings.

DETAILED DESCRIPTION OF THE INVENTION

An exemplary embodiment of the subject invention is a security policy providing protection against unauthorized users and tampering. This is accomplished, in part, by controlling user access and program access to files and to other programs. Note, in this description, files comprise data and programs.

Two access classes discussed herein include secrecy access class and integrity access class. Secrecy refers to protection of information contained in files or programs from unauthorized access by users or other programs. The rules used to determine the files and programs to which a user or program may have access are contained in the particular secrecy access class implemented. Also, the rules governing different types of access may differ. For instance, a user with secrecy access class of top secret may be allowed to read (is granted read access to) files and programs of secrecy access class top secret, secret, and confidential, but only be granted write access to files and programs of top secret access class. This aids in preventing accidental and malicious writing of top secret information into a file of confidential or secret access class.

The other class of protection is integrity protection. Integrity refers to protection of information from unauthorized tampering, modification or sabotage, such as from a computer virus or Trojan horse. The rules used to determine integrity protection are contained in the particular integrity access class implemented.

The types of access addressed in this description include writing, reading, transferring control, and chaining. A transfer of control occurs when a program executes a branch, transfer, or subroutine call instruction. A chain program starts another process running at a potentially different secrecy and integrity access class and shuts down the current running process. In this description, an execute function comprises transferring and chaining.

As can be seen from the above description, access is determined by the comparing access classes and applying security rules to the results of the access class comparisons. In an embodiment of the security policy, different sets of rules are assigned to write secrecy access class, read/execute secrecy access class, read integrity access class, and write/execute integrity access class.

Figure 1:
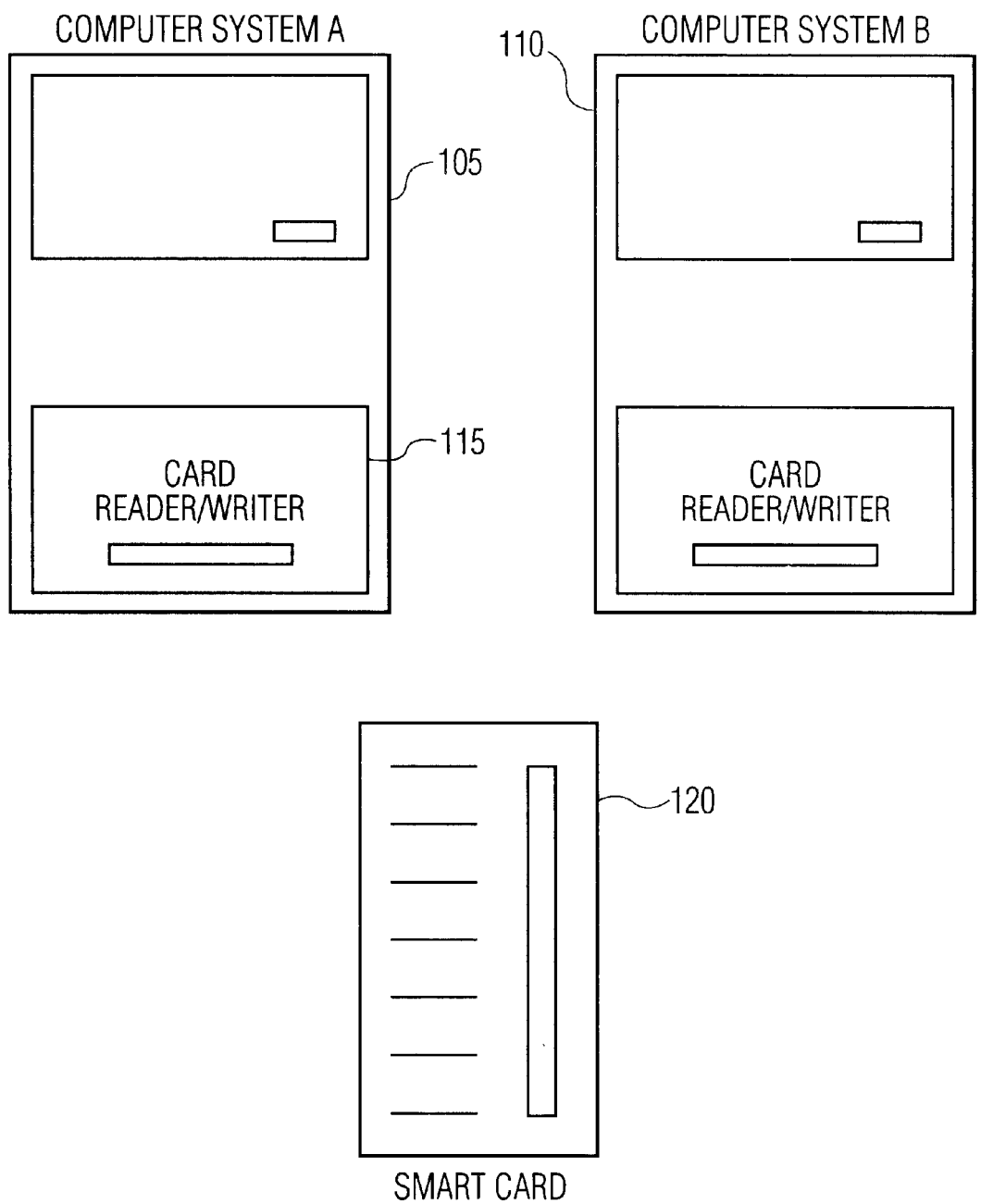
FIG. 1 is a block diagram illustrating an exemplary application of the security policy utilizing two computer systems 105, 110 a storage device (i.e., smart card), reader/writer 115, and a storage device (i.e., smart card 120)

FIG. 1 is a block diagram illustrating an exemplary application of the security policy utilizing two computer systems 105, 110, a reader/writer (such as a smart card reader/writer) 115, and a storage device (such as a smart card) 120. Communication protocols related to smart cards are described, for example, in Rank1, W., et al., Smart Card Handbook, John Wiley & Sons, 1997. Each computer system of FIG. 1 has associated with it a secrecy access class and an integrity access class. Each computer has a smart card reader/writer 115 into which the smart card is inserted. This smart card reader/writer 115 serves as an exemplary communication mechanism between the smart card 120 and the computer systems 105, 110. The connection between the smart card reader/writer 115 and the computer systems 105, 110 may be in various forms such as a hard wire connection, a telephone line, the Internet, or a radio frequency (RF) link. Also, the connection between the smart card 120 and the reader/writer 115 may be in various forms such as via insertion of the smart card into the reader/writer, or a radio frequency (RF) link. If the connection between the smart card 120 and the reader/writer 115 is via a radio frequency link, the smart card is referred to as a contactless smart card. Files and programs containing information may be written to and read from the smart card 120 by the computer systems 105, 110. Each file and program will have associated with it a secrecy access class and an integrity access class. Information contained in these files and programs is communicated between computers via the smart card if the respective access classes meet the security rules of the particular operation in question. Disclosure of information to users is in accordance with the rules of each secrecy access class. The prevention of tampering, sabotage, or unauthorized modification is in accordance with the rules of each integrity access class.

For example, assume that computer system A 105 functions as the system administrator. As system administrator, computer system A 105 has the authority to modify secrecy access class and integrity access classes. Assume that computer systems B 110 does not have the authority to modify a secrecy class or an integrity class. Also, assume the following secrecy class hierarchy: (1) a computer system with a secrecy access class of top secret has access to files and programs of three secrecy access classes (confidential, secret, and top secret); (2) a computer system with secrecy access class of secret has access to files and programs of secret and confidential access classes; and (3) a computer system with secrecy access class of confidential has access to files and programs of confidential access class. For purposes of this illustration, no distinction is made between read, write, and execute, although an embodiment of this invention does comprise this distinction and is considered a significant feature. Also for purposes of this illustration, categories are not mentioned, although an exemplary embodiment of this invention does include categories which is also considered a desirable feature. Further assume that computer system A 105 is assigned the secrecy access class of top secret and computer system B 110 the secrecy access class of secret. Assume that initially, all files and programs residing on the smart card have the same secrecy access class of confidential. Further assume that files and programs initially residing on computer system A 105 are assigned a secrecy access class of top secret and files and programs initially residing on computer system B 110 are assigned a secrecy access class of secret. Also assume that the integrity access class assigned to all the computer systems, files, and programs is such that it provides protection from all known viruses and Trojan horses. Assuming no viruses or Trojan horses are present, and under the above assumptions, both computer systems 105, 110 are granted access to information on the smart card 120. Computer system A 105 is granted access to all files and programs residing on the smart card 120 written by computer systems B 110 because computer system A 105 has a secrecy access class of top secret and files written by computer system B 110 have secrecy access of secret. Computer system B 110 is not granted access to files written on the smart card 120 by computer system A 105. As system administrator, computer system A may modify (e.g., upgrade or downgrade) the secrecy access of a file or program residing on the smart card 120. This could effectively grant computer system B 110 access to a file generated by computer system A 105, residing on the smart card 120. As the above example illustrates, access to files and programs is determined by comparing the respective access classes and applying the security rules.

Figure 2:
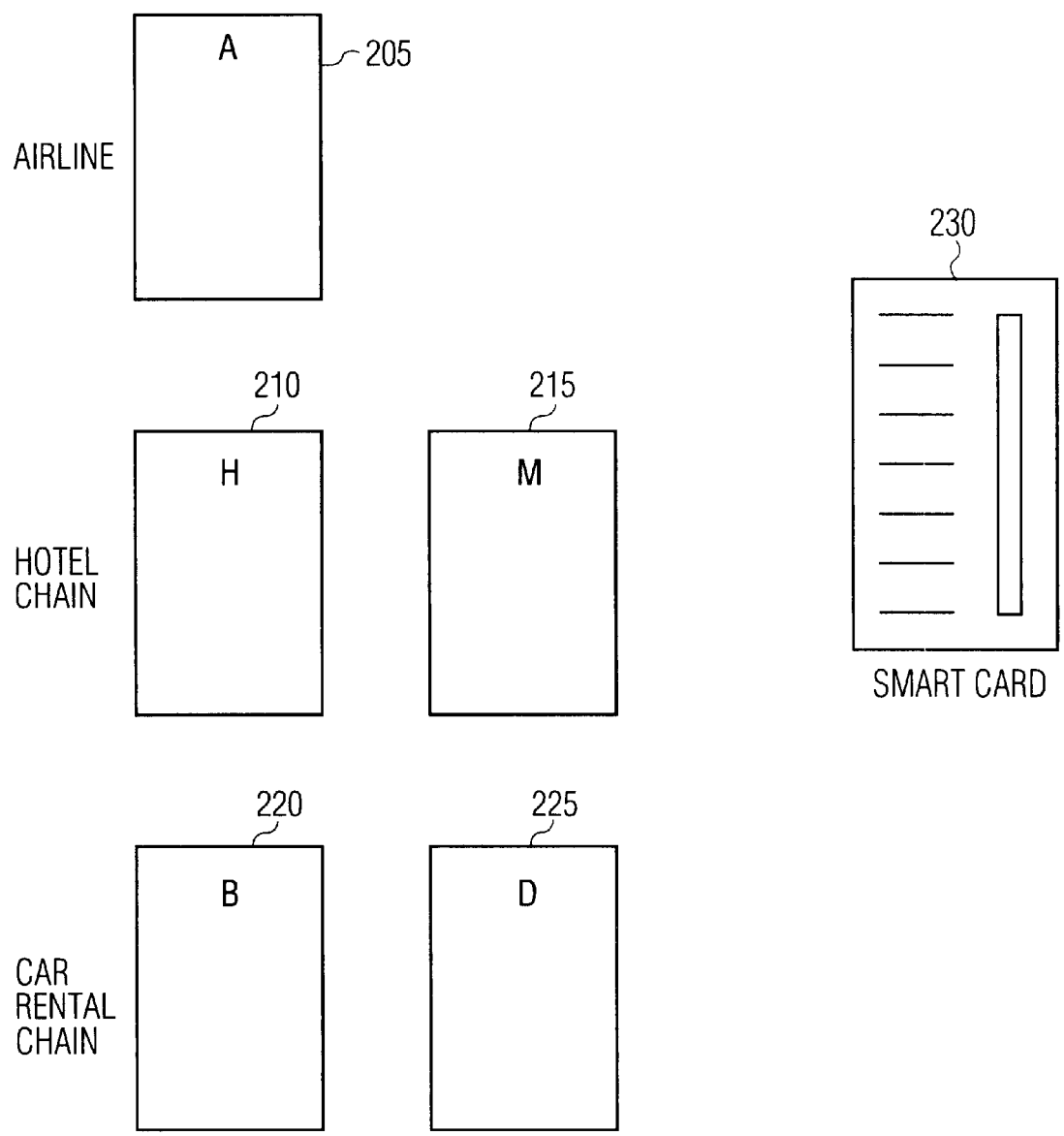
FIG. 2 is a block diagram illustrating an exemplary embodiment of an airline 205, a hotel chain 210, 215, and a rental car chain 220, 225 loyalty system implementing the security policy with a smart card 230.

FIG. 2 is a block diagram illustrating an exemplary embodiment of an airline 205, a hotel chain 210, 215, and a rental car chain 220, 225 loyalty system implementing the security policy with a smart card 230. Assume airline A 205 has ties to hotel chains H 210 and M 215 and rental car chains B 220 and D 225. Staying at the hotel chains earns airline loyalty points. Hotel H 210 gives hotel loyalty points in addition to airline points, while hotel M 215 gives hotel points or airline points, but not both. Hotel H 210 loyalty points and Hotel M 215 loyalty points are completely separate systems. Furthermore, the hotel chains consider the information about where and when the customer has stayed to be valuable marketing information, since the competing hotel chain could use this information for target marketing. However, the customer and the airline would like all three loyalty systems to be managed from a single smart card 230, so that the customer need only carry one card. Hotel chains H 210 and M 215 do not trust one another, but are both willing to cooperate with the airline A 205.

Based on the above assumptions, it can be seen that the software managing hotel H 210 loyalty points must behave differently from the software managing hotel M 215 loyalty points. This is because the hotels have different policies pertaining to customers earning points in both hotel and airline plans. Furthermore, the software for both hotel chains and for the airline may need periodic updating to reflect limited time special offers, newly contracted partners, or other significant changes. Tracking of this information could be done on the smart card 230 itself, rather than requiring the central servers for the airline 205, the hotels 210, 215, and the rental car companies 220, 225 to all communicate with one another. Thus, data files storing loyalty information for each company resides on the smart card 230.

Initially, the customer goes to the airport to fly on airline A 205 and earns loyalty points. These are recorded in a file to which only the airline has access. The airline must also make today's flight information available to all partners. The airline wants to indicate that the customer has flown that day, but it might not want to give full flight details, due to either company confidentiality concerns or customer privacy concerns. Therefore, the airline application writes to a different file, that is read accessible by the partners, to indicate that the customer flew today, but with no further details. Any partner application can read this information (assuming only one airline). Next the customer rents a car from company B 220. Company B's application code computes how many airline loyalty points to grant, and wants to communicate this information to the airline application, but it does not want the information to be known by rental car company D 225. Therefore, company B 220 writes the number of points earned into a communications file. It then modifies the classification of that file to allow access by airline A 205 and company B 220, but not to company D 225. However, modification of the classification of that file is a risky operation. If Company B's application code contains flaws or, worse still, contains a Trojan horse or a virus, then either the wrong information might be passed to airline A 205, or the classification might be incorrectly modified to allow access to company D 225. The program that does the modification of the classification must have high integrity to assure that such accidental or deliberate errors do not occur. The above example simply illustrates a practical application of access to files and programs being determined by access class.

Figure 3:
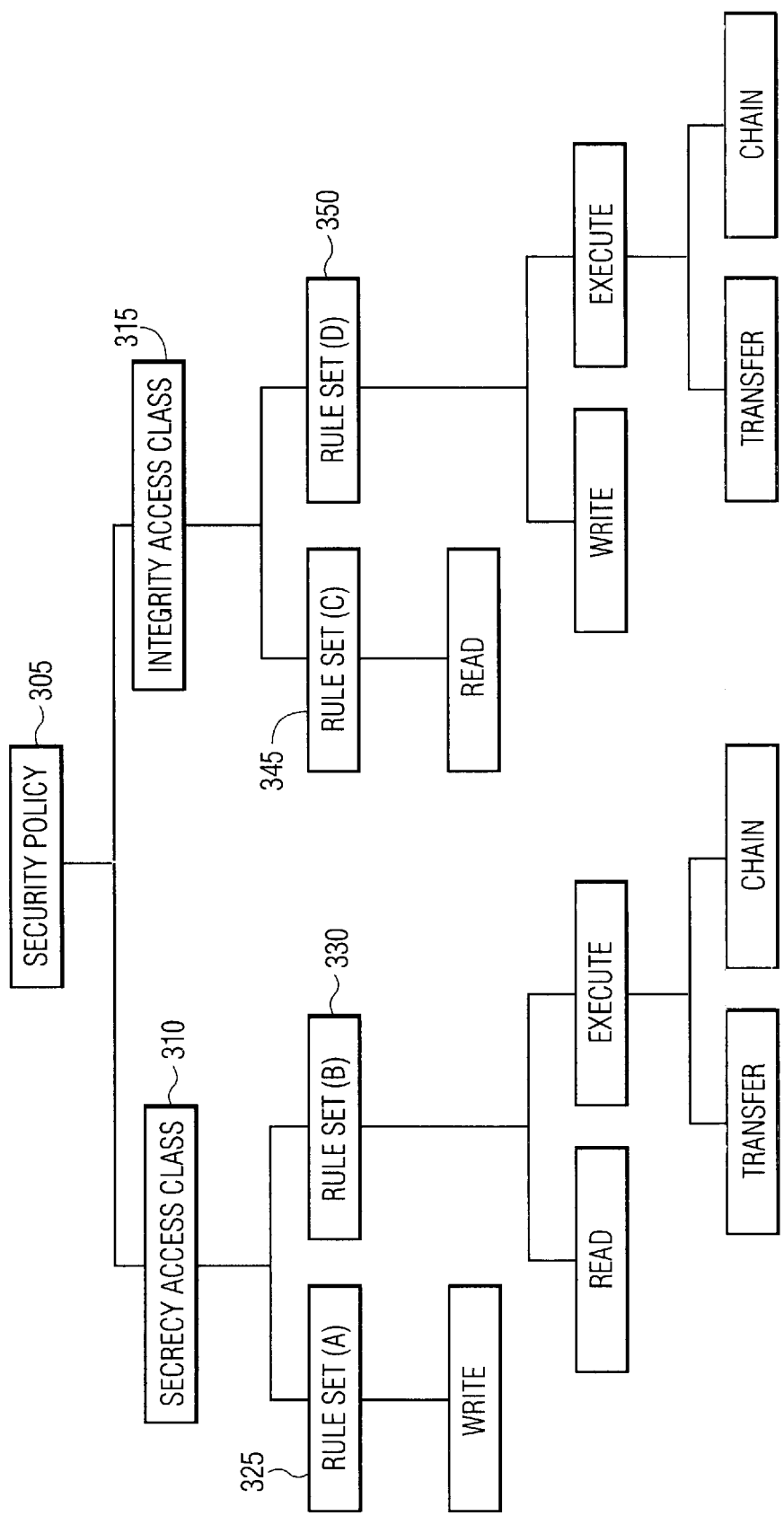
FIG. 3 is a block diagram illustrating an exemplary embodiment of the security policy's components.

FIG. 3 is a block diagram illustrating an exemplary embodiment of the security policy's components. This exemplary embodiment of the security policy 305 comprises a secrecy access class 310 and an integrity access class 315. Each of these classes comprises specific rules. Secrecy refers to protection of information from disclosure to unauthorized users. Integrity refers to protection of information from unauthorized tampering, modification, or sabotage (e.g., Trojan horse, virus).

In an exemplary embodiment, a secrecy access class 310 comprises two sets of rules. One set of rules 325 governs the write function, referred to as the write access class. The other set of rules 330 governs reading and executing, where the execute function comprises transferring and chaining. For purposes of this discussion, when access to a file or a program is desired by an accessing program, the file to be accessed is referred to as a target file and the program to be accessed is referred to as a target program. An integrity access class 315 comprises two sets of rules. One set of rules 345 governs the read function, referred to as the read access class. The other set of rules 350 governs writing and executing, where the execute function comprises transferring and chaining.

An exemplary embodiment of the security policy comprises the following rules.

For integrity access class read permission: Integrity read access class of the accessing program must be less than or equal to the integrity access class of the target file or target program.

For integrity access class write permission: Integrity write/execute access class of the accessing program must be greater than or equal to the integrity access class of the target file or target program.

For secrecy access class read/execute permission: Secrecy read/execute access class of the accessing program must be greater than or equal to the secrecy access class of the target file or target program.

For secrecy access class write permission: Secrecy write access class of the accessing program must be less than or equal to the secrecy access class of the target file or target program.

For transfer execute permission: Secrecy read/execute access class of the accessing program must be greater than or equal to the secrecy access class of the target file or target program; and the integrity write/execute access class of the accessing program must be less than or equal to the integrity access class of the target file or target program.

For chain execute permission: Secrecy read/execute access class of the accessing program must be greater than or equal to the secrecy access class of the target file or target program; and the secrecy write access class of the accessing program must be less than or equal to the runtime read/execute secrecy class of the new process; and the integrity write/execute access class of the accessing program must be greater than or equal to the integrity read access class of the new process.

For transfer permission the target program runs at the integrity level of the caller. A high integrity program cannot call or transfer to lower integrity code. For chain permission, the first rule ensures that chain is possible only to files to which the caller has secrecy read access permission. Integrity read access permission is not required. The second rule ensures that the target process must have secrecy read access permission to any passed arguments, and the third rule ensures that the target process is not contaminated by a low integrity argument.

Figure 4:
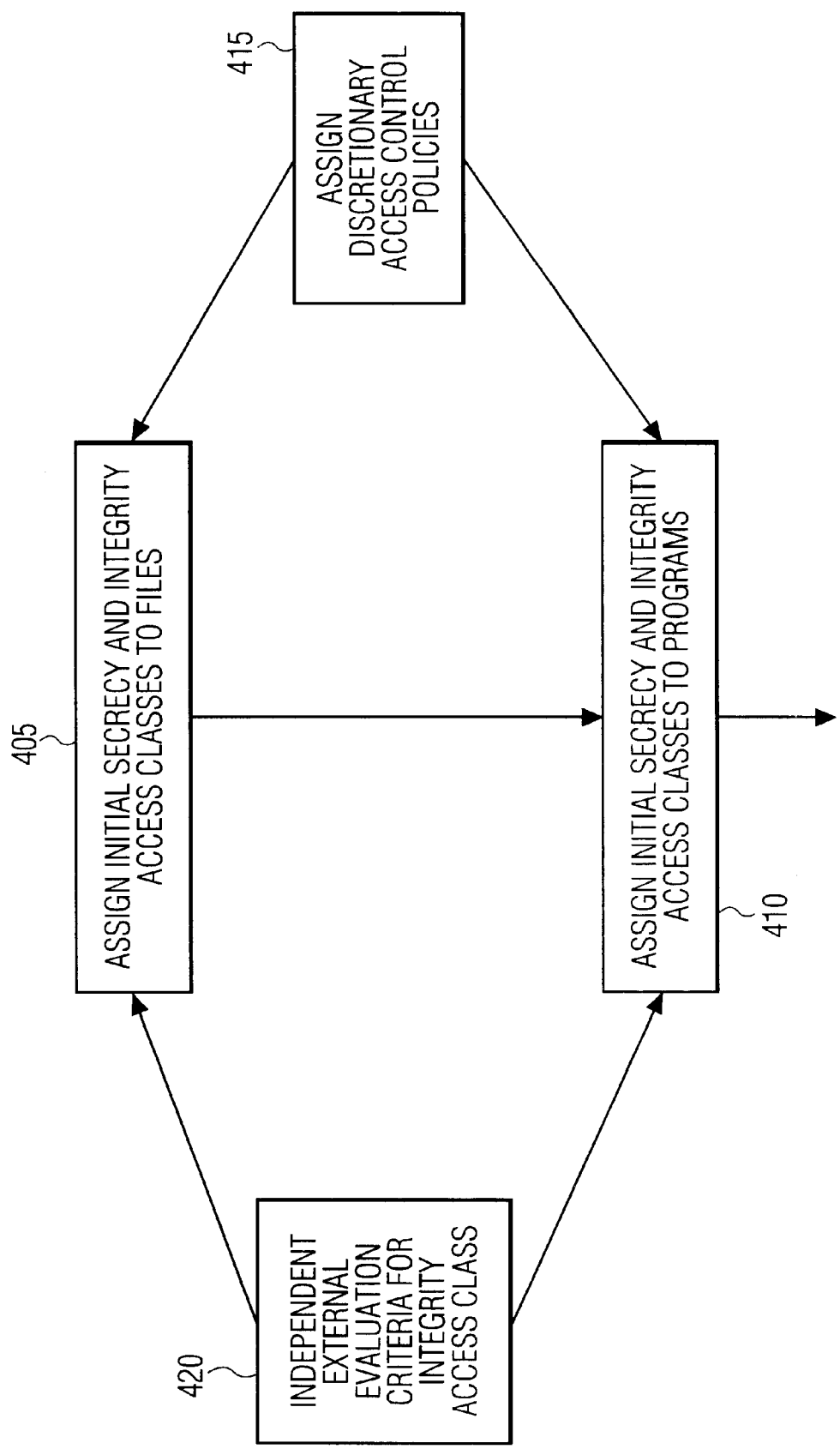
FIG. 4 is a block diagram illustrating an exemplary embodiment of the initialization process.

FIG. 4 is a block diagram illustrating an exemplary embodiment of the initialization process. Initially, an access class is assigned to each file 405 by a system administrator. In the previous example, for instance, the airline 205 would assign an initial access class to each of its files and to each file to be used by the hotel chain 210, 215 and the car rental chain 220, 225. Since an access class comprises a secrecy class and an integrity class, as depicted in FIG. 3, initial assigning of an access class to each file includes assigning initial secrecy and integrity access classes to each file. Files may include both data and programs. An initial access class is also assigned to each accessing program 410 by a system administrator. In the previous example, the airline 205 would assign an initial access class to each of its accessing programs and to each accessing program to be used by the hotel chain 210, 215 and the car rental chain 220, 225. Accessing programs include programs that access files and programs that access other programs. Since an access class comprises a secrecy class and an integrity class, as depicted in FIG. 3, initial assigning of an access class to each accessing program includes assigning initial secrecy and integrity access classes to each accessing program. The initial assigning of access classes may be done in any order, or concurrently.

Further exemplary operation of the embodiment shown in FIG. 2 is now described. As discussed before, company B 220 desires to modify the classification of a communications file to allow access by airline A 205, but not to company D 225. It also desires to be sure that the information written into that file is ONLY the information intended for airline A 205 and not any other information that airline A 205 should not be permitted to see. FIGS. 6, 7, 8, and 9 show a step by step procedure of one example approach to use the security model to achieve these goals. The block diagrams in these figures show the programs and data files used by company B 220 to reclassify the information and send it to airline A 205.

FIGS. 6–9 all show the same items (programs and files) numbered x10, x20, x30, x40, and x50, where x is a value from 6 through 9. The purpose of the figures is to show the passage of time and what happens to those items.

Figure 6:
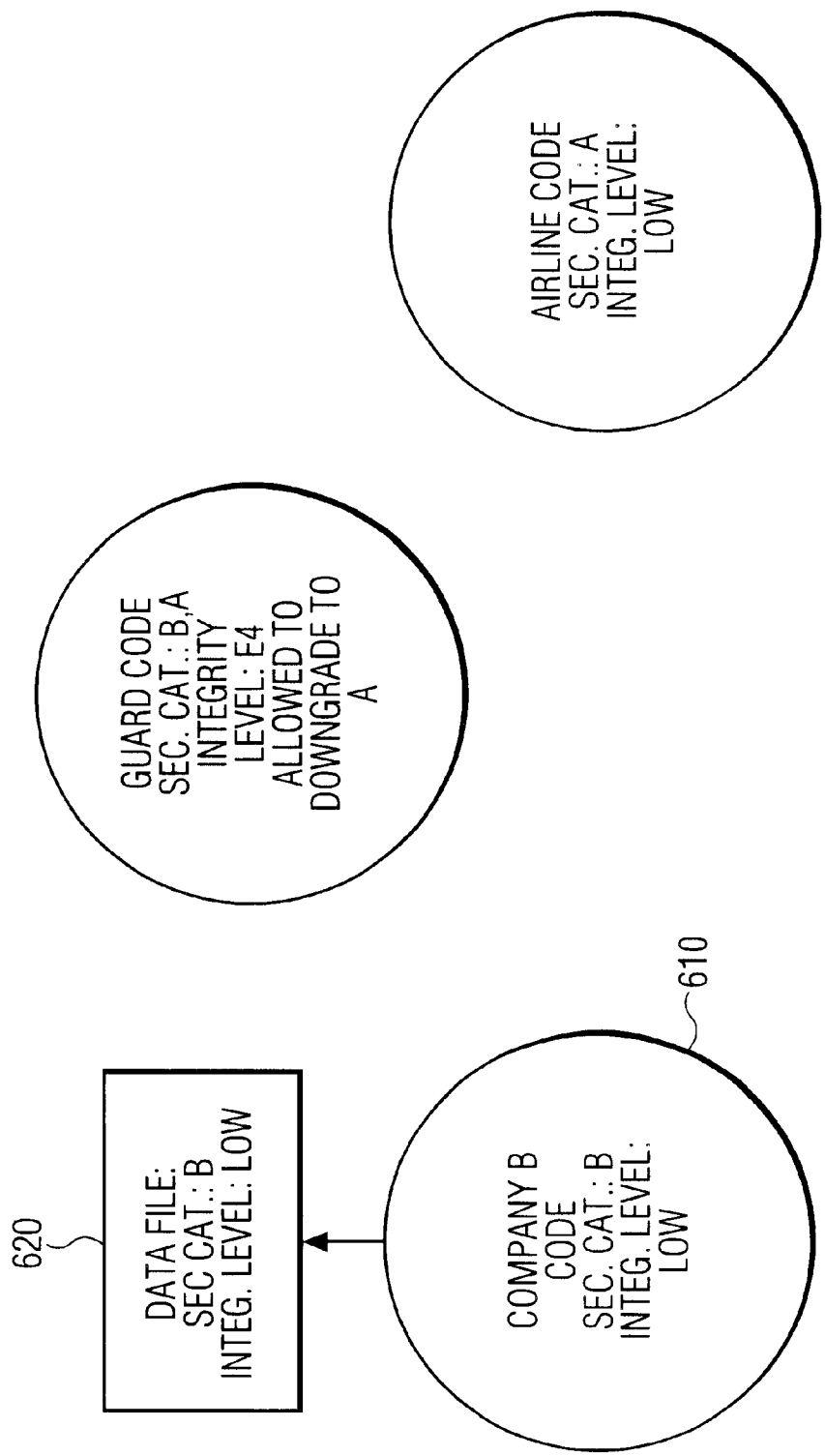
FIGS. 6–9 are flow chart diagrams which illustrate operation of an exemplary embodiment of the present invention.

FIG. 6 shows the applications program 610 of company B that computes the number of loyalty points and writes that information into communications file 620. Applications program 610 is allowed to access to read and write information in secrecy access class B, and has an integrity level of low.

Figure 7:
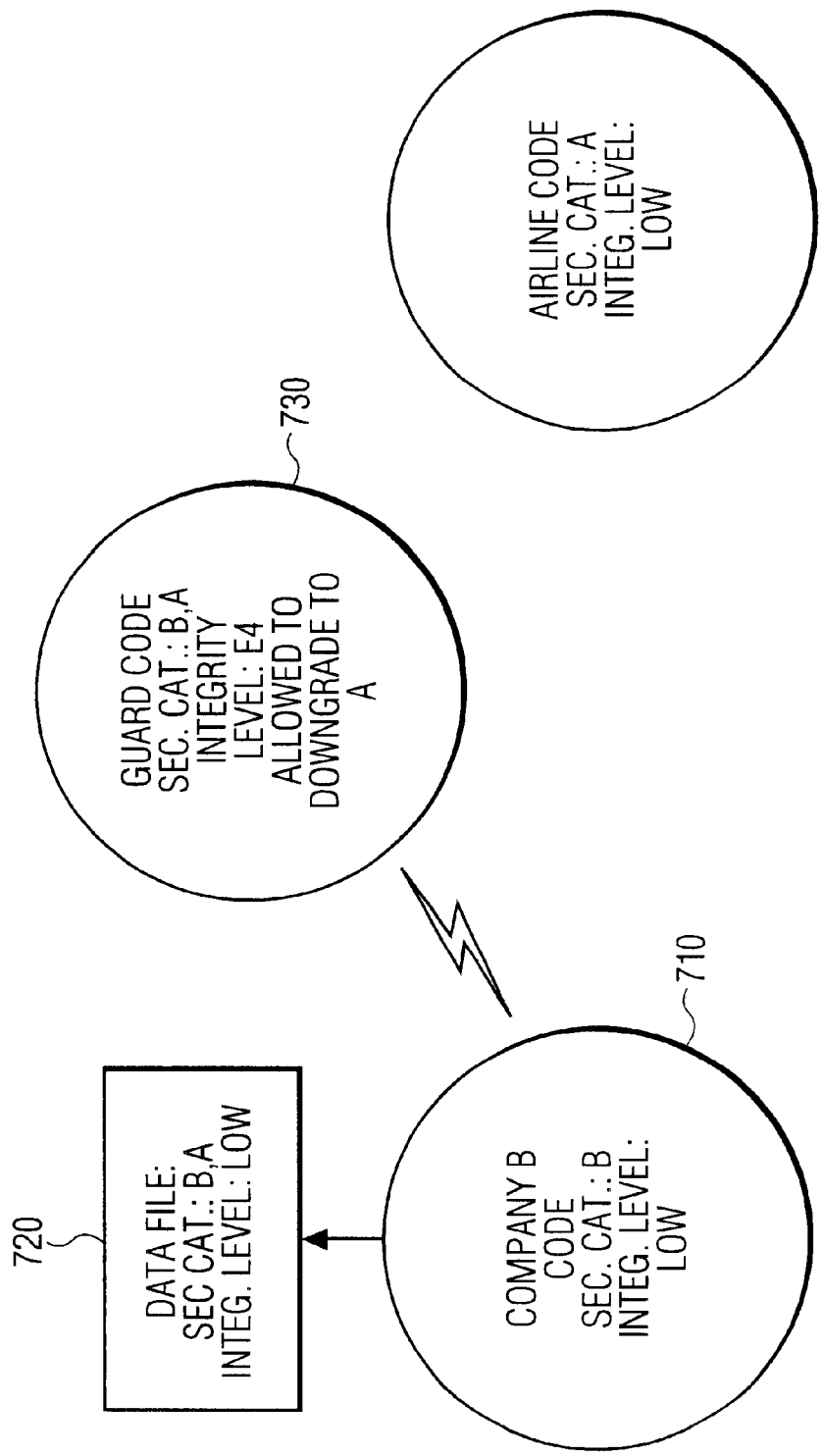

FIG. 7 shows the applications program 710 of company B upgrade the access class of communications file 720 to categories A and B, and then execute a CHAIN operation to the guard program 730. Guard program 730 is allowed to read and write information in secrecy class A+B and has an integrity level of E4, and it is allowed to downgrade information to secrecy class A only.

Figure 8:
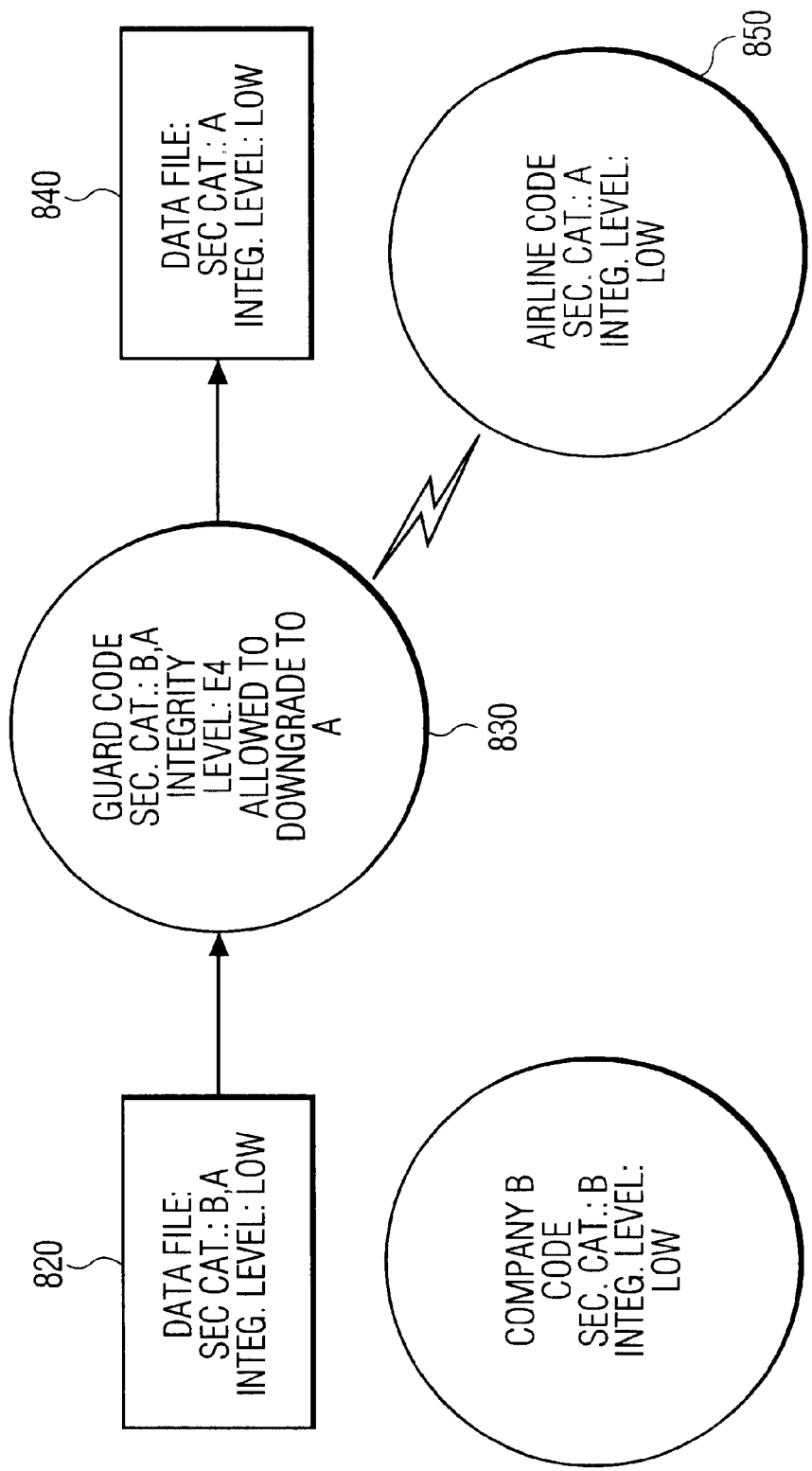

FIG. 8 shows the guard program 830 read the information from communications file 820 at secrecy access class categories A and B and downgrade that information by writing it into communications file 840 at secrecy access class category A only. Guard program 830 has a high integrity level of E4 and is therefore trusted to first inspect the data from file 820 to ensure that it only contains loyalty point information and that the value of the loyalty points is reasonable. Only after performing those checks does the guard write the data to file 840. The guard program 830 then performs a CHAIN operation to applications program 850 of airline A.

Figure 9:
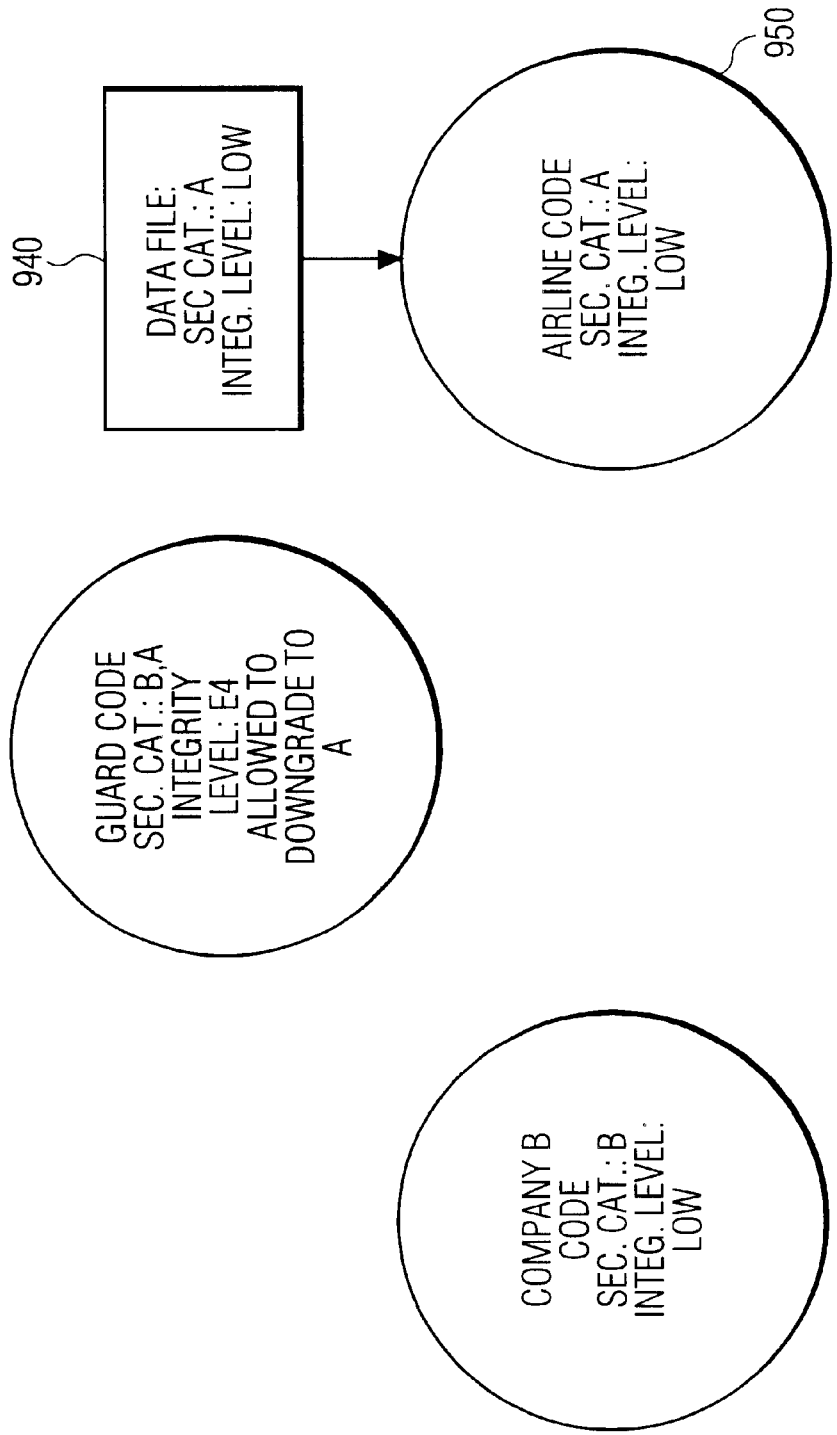

FIG. 9 shows applications program 950 of airline A that is allowed only to read and write information at secrecy access class category A. Applications program 950 reads the loyalty information from communications file 940 and awards the appropriate number of loyalty points.

This scheme shown in FIGS. 6 through 9 is purely exemplary, and it will be understood to one of ordinary skill in the art that the security model can be used in many other ways to control passing of information from one access class to another.

In another embodiment of the security policy, the system may implement discretionary security policies, which contain rules that must also be met before access is granted 415. This gives the user discretionary access control to the extent that both the discretionary access control rules and the above mandatory secrecy and integrity access class rules apply. Thus the user has the discretionary ability to deny access even if the secrecy and integrity rules are met, but the user can not grant access if the secrecy or integrity rules are not met. Examples of well-known discretionary policies include access control lists, permission bits, capability lists, etc.

In another embodiment of the security policy, a system administrator assigns an integrity access class based on the results of an independent external evaluation process 420. Examples of independent external evaluation processes include ITSEC (Information Technology Security Evaluation Criteria (ITSEC), June 1991, Commission of the European Communities: Brussels, Belgium) E levels and Common Criteria (Information Technology—Security Techniques—Evaluation Criteria for IT Security, ISO/IEC 15408-1, 15408-2, 15408-3, 1999) EAL levels. Independent external evaluation allows a system administrator to assign a file or program a higher integrity access class than would be assigned without an independent external evaluation, because the file or program is considered to be more trustworthy.

Figure 5:
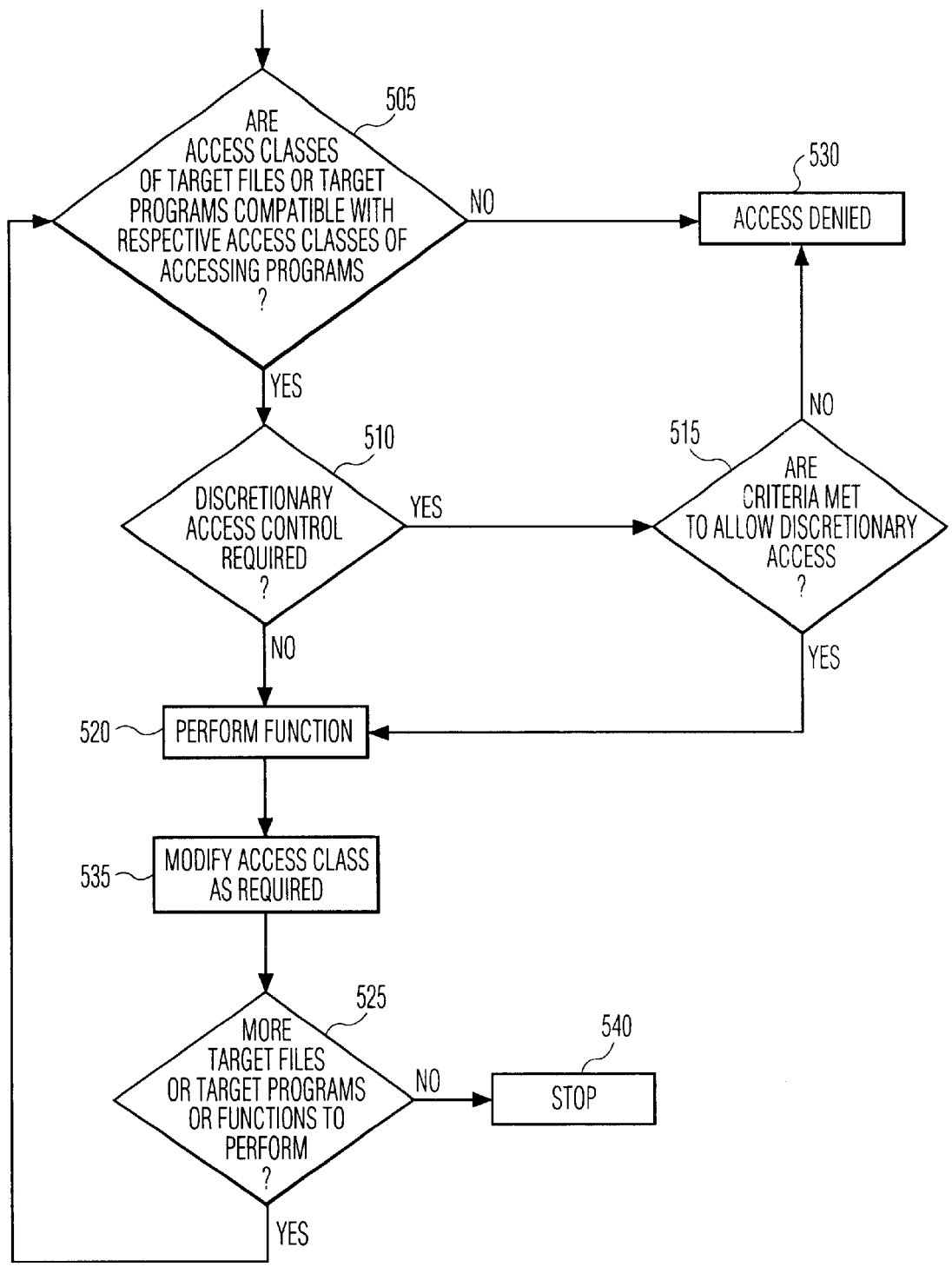
FIG. 5 is a flow diagram illustrating an embodiment of the security policy.

FIG. 5 is a flow diagram illustrating an embodiment of the security policy. Before access is granted, the respective mandatory access classes of the target file or target program, and accessing program are compared 505. Access to a target file or target program is determined in accordance with the rules associated with the respective access classes. If the respective access classes do not comply with the security rules, access is denied 530. If the respective mandatory access classes do comply with the security rules, then it must be determined if discretionary access control is required 510. If no discretionary access control is required, the function is performed 520. If discretionary access control is required, the user must determine if access should be granted 515. If discretionary access is granted, the function is performed 520. If discretionary access is not granted, access is denied 530.

Discretionary access control may incorporate many types of policies such as access control lists, permission bits, capability lists, and role-based policies. Functions 520 include reading, writing, transferring, and chaining. Mandatory and discretionary access determination may be accomplished in any order or concurrently.

Next, the access class of a target file, target program, or accessing program is modified as required 535. Modification includes upgrading an access class and downgrading an access class. Modification is in accordance with the rules of the respective access class. In an embodiment of the security policy, modification of the secrecy access class of a target file or target program is based on the integrity access class of the accessing program. For example, downgrading of a secrecy access class could be based on the approach used in the National Security Agency's so-called Yellow Books. (Computer Security Requirements—Guidance for Applying the Department of Defense Trusted Computer System Evaluation Criteria in Specific Environments, CSC-STD-003-85, Jun. 25, 1985, DoD Computer Security Center: Ft. George G. Meade, Md. and Technical Rationale Behind CSC-STD-003-85: Computer Security Requirements—Guidance for Applying the Department of Defense Trusted Computer System Evaluation Criteria in Specific Environments, CSC-STD-004-85, Jun. 25, 1985, DoD Computer Security Center: Ft. George G. Meade, Md.) The Yellow Books establish United States Department of Defense policy on what level of security evaluation is required as a function of risk. The approach looks at the maximum secrecy level of data and the minimum trustworthiness level of users to determine a risk range over which the software must preserve security. The higher the risk range, the higher evaluation level required. If more files or programs are to be accessed, the process is repeated 525, if not, the process stops 540.

Although illustrated and described above with reference to certain specific embodiments, the present invention is nevertheless not intended to be limited to the details shown. Rather, various modifications may be made in the details within the scope and range of equivalents of the claims and without departing from the spirit of the invention.

What is claimed:

1. A method of controlling access to files by accessing programs, said method comprising the steps of:
   a) assigning an initial access class to each of said files, wherein:
      said access class comprises an integrity access class and a secrecy access class,
      said secrecy access class comprises rules governing disclosure of data contained in said files,
      said integrity access class comprises rules governing modification of data contained in said files,
      said integrity access class comprises two components including a first integrity access class component which comprises rules for allowing the performance of a read function, and a second integrity access class component which comprises rules for allowing performance of writing and executing,
      said secrecy access class comprises two components including a first secrecy access class component which comprises rules for allowing the performance of a write function, and a second secrecy access class component which comprises rules for allowing performance of reading and executing,
   b) assigning an initial access class to each of said accessing programs, each accessing program performing at least one of writing, reading, and executing;
   c) comparing the access class of one of said files, said one of said files being a target file, with the access class of one of said accessing programs, said one of said accessing programs being a targeting accessing program, to operate on said target file in accordance with the respective rules of each accessing class;
   d) allowing said targeting accessing program to operate on said target file if said comparison results in said target file and said targeting accessing program being allowed by the security rules;
   e) modifying the access class of said target file in accordance with at least one of the rules of said targeting accessing program access class and the rules of said target file access class; said modifying includes at least one of downgrading the access class and upgrading the access class; and
   f) modifying the access class of said targeting accessing program in accordance with at least one of the rules of said targeting accessing program access class and the rules of said target file access class; said modifying includes at least one of downgrading the access class and upgrading the access class;
      wherein assigning of said integrity access class comprises an independent external evaluation process which is selected from the group consisting of ITSEC E levels and Common Criteria EAL levels.

2. The method of claim 1 wherein steps c through f are repeated until no target files remain to be operated on by targeting accessing programs.

3. The method of claim 1, wherein the step of modifying the secrecy access class of said target file further comprises evaluating of the integrity access class of the targeting accessing program, and utilizing results of said evaluating to determine an extent of said modification.

4. The method of claim 3, wherein executing comprises transferring and chaining, and wherein chaining comprises starting another process.

5. The method of claim 1, wherein said allowing of said targeting accessing program to operate on said target file is independently controlled by a discretionary access control policy.

6. The method of claim 1 wherein said files reside on a smart card.

7. An apparatus for controlling access to files by accessing programs, said apparatus comprising:
   a) means for assigning an initial access class to each of said files, wherein:
      said access class comprises an integrity access class and a secrecy access class,
      said secrecy access class comprises rules governing disclosure of data contained in said files,
      said integrity access class comprises rules governing modification of data contained in said files,
      said integrity access class comprises two components including a first integrity access class component which comprises rules for allowing the performance of a read function, and a second integrity access class component which comprises rules for allowing performance of writing and executing, said secrecy access class comprises two components including a first secrecy access class component which comprises rules for allowing the performance of a write function, and a second secrecy access class component which comprises rules for allowing performance of reading and executing, b) means for assigning an initial access class to each of said accessing programs, each accessing program performing at least one of writing, reading, and executing;

c) means for comparing the access class of one of said files, said one of said files being a target file, with the access class of one of said accessing programs, said one of said accessing programs being a targeting accessing program, to operate on said target file in accordance with the respective rules of each accessing class;

d) means for allowing said targeting accessing program to operate on said target file if said comparison results in said target file and said targeting accessing program being allowed by the security rules;

e) means for modifying the access class of said target file in accordance with at least one of the rules of said targeting accessing program access class and the rules of said target file access class; wherein said modifying includes downgrading the access class and upgrading the access class; and f) means for modifying the access class of said targeting accessing program in accordance with at least one of the rules of the targeting accessing program access class and the rules of said target file access class; wherein said modifying includes at least one of downgrading the access class and upgrading the access class;

wherein the means for assigning said integrity access class comprises an independent external evaluation process which is selected from the group consisting of ITSEC E levels and Common Criteria EAL levels.

8. The apparatus according to claim 7, wherein said modifying means modifies the access class of a plurality of target files until no target files remain to be operated on by targeting accessing programs.

9. The apparatus according to claim 7, wherein the means for modifying the secrecy access class of said target file further comprises evaluating of the integrity access class of the targeting accessing program, and utilizing results of said evaluating to determine an extent of said modification.

10. The apparatus according to claim 9, wherein executing comprises transferring and chaining, and wherein chaining comprises starting another process.

11. The apparatus according to claim 7, wherein said means for allowing said targeting accessing program to operate on said target file is independently controlled by a discretionary access control policy.

12. The apparatus according to claim 7 wherein said files reside on a smart card.

13. An article of manufacture comprising a computer useable medium having computer readable program code means embodied therein for controlling access to files by accessing programs, the computer readable program code means in said article of manufacture comprising computer readable program code means for causing a computer to effect:

a) assigning an initial access class to each of said files, wherein:

said access class comprises an integrity access class and a secrecy access class, said secrecy access class comprises rules governing disclosure of data contained in said files, said integrity access class comprises rules governing modification of data contained in said files, said integrity access class comprises two components including a first integrity access class component which comprises rules for allowing the performance of a read function, and a second integrity access class component which comprises rules for allowing performance of writing and executing, said secrecy access class comprises two components including a first secrecy access class component which comprises rules for allowing the performance of a write function, and a second secrecy access class component which comprises rules for allowing performance of reading and executing, b) assigning an initial access class to each of said accessing programs, each accessing program performing at least one of writing, reading, and executing;

c) comparing the access class of one of said files, said one of said files being a target file, with the access class of one of said accessing programs, said one of said accessing programs being a targeting accessing program, to operate on said target file in accordance with the respective rules of each accessing class;

d) allowing said targeting accessing program to operate on said target file if said comparison results in said target file and said targeting accessing program being allowed by the security rules;

e) modifying the access class of said target file in accordance with at least one of the rules of said targeting accessing program access class and the rules of said target file access class; said modifying includes at least one of downgrading the access class and upgrading the access class; and f) modifying the access class of said targeting accessing program in accordance with at least one of the rules of said targeting accessing program access class and the rules of said target file access class; said modifying includes at least one of downgrading the access class and upgrading the access class;

wherein assigning of said integrity access class comprises an independent external evaluation process which is selected from the group consisting of ITSEC E levels and Common Criteria EAL levels.

14. An article of manufacture as recited in claim 13, wherein said files reside on a smart card.

15. A program storage device readable by machine, tangibly embodying a program of instructions executable by the machine to perform method steps for controlling access to files by accessing programs, said method comprising the steps of:

a) assigning an initial access class to each of said files, wherein:

said access class comprises an integrity access class and a secrecy access class, said secrecy access class comprises rules governing disclosure of data contained in said files, said integrity access class comprises rules governing modification of data contained in said files, said integrity access class comprises two components including a first integrity access class component which comprises rules for allowing the performance of a read function, and a second integrity access class component which comprises rules for allowing performance of writing and executing, said secrecy access class comprises two components including a first secrecy access class component which comprises rules for allowing the performance of a write function, and a second secrecy access class component which comprises rules for allowing performance of reading and executing, b) assigning an initial access class to each of said accessing programs, each accessing program performing at least one of writing, reading, and executing;

c) comparing the access class of one of said files, said one of said files being a target file, with the access class of one of said accessing programs, said one of said accessing programs being a targeting accessing program, to operate on said target file in accordance with the respective rules of each accessing class;

d) allowing said targeting accessing program to operate on said target file if said comparison results in said target file and said targeting accessing program being allowed by the security rules;

e) modifying the access class of said target file in accordance with at least one of the rules of said targeting accessing program access class and the rules of said target file access class; said modifying includes at least one of downgrading the access class and upgrading the access class; and f) modifying the access class of said targeting accessing program in accordance with at least one of the rules of said targeting accessing program access class and the rules of said target file access class; said modifying includes at least one of downgrading the access class and upgrading the access class;

wherein assigning of said integrity access class comprises an independent external evaluation process which is selected from the group consisting of ITSEC E levels and Common Criteria EAL levels.

16. A program storage device as recited in claim 15, wherein said files reside on a smart card.

17. A computer program product comprising a computer useable medium having computer readable program code means embodied therein for causing controlling of access to files by accessing programs, the computer readable program code means in said computer program product comprising computer readable program code means for causing a computer to effect:

a) assigning an initial access class to each of said files, wherein:

said access class comprises an integrity access class and a secrecy access class, said secrecy access class comprises rules governing disclosure of data contained in said files, said integrity access class comprises rules governing modification of data contained in said files, said integrity access class comprises two components including a first integrity access class component which comprises rules for allowing the performance of a read function, and a second integrity access class component which comprises rules for allowing performance of writing and executing, said secrecy access class comprises two components including a first secrecy access class component which comprises rules for allowing the performance of a write function, and a second secrecy access class component which comprises rules for allowing performance of reading and executing, b) assigning an initial access class to each of said accessing programs, each accessing program performing at least one of writing, reading, and executing;

c) comparing the access class of one of said files, said one of said files being a target file, with the access class of one of said accessing programs, said one of said accessing programs being a targeting accessing program, to operate on said target file in accordance with the respective rules of each accessing class;

d) allowing said targeting accessing program to operate on said target file if said comparison results in said target file and said targeting accessing program being allowed by the security rules;

e) modifying the access class of said target file in accordance with at least one of the rules of said targeting accessing program access class and the rules of said target file access class; said modifying includes at least one of downgrading the access class and upgrading the access class; and f) modifying the access class of said targeting accessing program in accordance with at least one of the rules of said targeting accessing program access class and the rules of said target file access class; said modifying includes at least one of downgrading the access class and upgrading the access class;

wherein assigning of said integrity access class comprises an independent external evaluation process which is selected from the group consisting of ITSEC E levels and Common Criteria EAL levels.

18. A computer program product as recited in claim 17, wherein said files reside on a smart card.

* * * * *